United States Patent
Peterson et al.

(10) Patent No.: US 10,089,228 B2
(45) Date of Patent: Oct. 2, 2018

(54) I/O BLENDER COUNTERMEASURES

(71) Applicant: Dell Products L.P., Round Rock, TX (US)

(72) Inventors: Scott David Peterson, Beaverton, OR (US); Sujoy Sen, Beaverton, OR (US)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 15/150,035

(22) Filed: May 9, 2016

(65) Prior Publication Data
US 2017/0322882 A1    Nov. 9, 2017

(51) Int. Cl.
G06F 12/02 (2006.01)
G06F 12/0804 (2016.01)
G06F 12/0813 (2016.01)
G06F 12/0815 (2016.01)
G06F 12/084 (2016.01)
G06F 9/455 (2018.01)

(52) U.S. Cl.
CPC ...... *G06F 12/0804* (2013.01); *G06F 9/45558* (2013.01); *G06F 12/084* (2013.01); *G06F 12/0813* (2013.01); *G06F 12/0815* (2013.01); G06F 2009/45579 (2013.01); G06F 2009/45583 (2013.01); G06F 2212/152 (2013.01); G06F 2212/60 (2013.01); G06F 2212/621 (2013.01)

(58) Field of Classification Search
None
See application file for complete search history.

(56) References Cited

U.S. PATENT DOCUMENTS

| | | | |
|---|---|---|---|
| 2013/0086309 A1* | 4/2013 | Lee | G06F 12/0246 711/103 |
| 2014/0258637 A1* | 9/2014 | Hong | G06F 12/0808 711/135 |
| 2015/0010143 A1* | 1/2015 | Yang | G09C 1/00 380/28 |
| 2015/0058527 A1* | 2/2015 | Venkata | G06F 12/0873 711/103 |
| 2015/0220354 A1* | 8/2015 | Nair | G06F 13/28 710/301 |

(Continued)

*Primary Examiner* — Charles Rones
*Assistant Examiner* — Ryan Dare
(74) *Attorney, Agent, or Firm* — Jackson Walker L.L.P.

(57) ABSTRACT

A cache storage method includes providing a storage cache cluster, comprising a plurality of cache storage elements, for caching I/O operations from a plurality of virtual machines associated with a corresponding plurality of virtual hard disks mapped to a logical storage area network volume or LUN. Responsive to a cache flush signal, flush write back operations are performed to flush modified cache blocks to achieve or preserve coherency. The flush write back operations may include accessing current time data indicative of a current time, determining a current time window in accordance with the current time, determining a duration of the current time window, and identifying a current cache storage element corresponding to the current time window. For a duration of the current time window, only those write back blocks stored in the current cache storage element are flushed. In addition, the applicable write back blocks are flushed in accordance with logical block address information associated with each write back block.

18 Claims, 5 Drawing Sheets

(56) References Cited

U.S. PATENT DOCUMENTS

2015/0261615 A1* 9/2015 Peterson ............. G06F 11/1446
714/6.23
2016/0077972 A1* 3/2016 Pease .................. G06F 12/0891
711/141

* cited by examiner

I/O BLENDER COUNTERMEASURES

TECHNICAL FIELD

The present disclosure relates to information handling systems and, more specifically, virtualized information handling systems that generate large significant I/O storage transactions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems frequently employ slow but inexpensive magnetic hard disk drives (HDDs) as the primary form of persistent data storage device. Faster devices may be used as a storage cache in such systems to improve I/O performance. However, most valid data residing in a storage cache is eventually written back to the primary data storage device.

The write back efficiency of a data storage system may not be a significant component of overall I/O performance during normal operating periods because write backs are likely to occur relatively infrequently if a sufficiently sized cache is employed and because write backs that do occur generally pertain to a small number of storage cache entries.

An operating system may sort HDD read/write operations in logical block address (LBA) order to reduce the overall seek latency. If, however, the same system is virtualized as multiple virtual machines with two or more of them sharing a common set of one or more HDDs, the individually sorted I/O streams are aggregated by the hypervisor and the aggregated I/O stream is generally no longer sorted in LBA order. The lack of LBA ordering exhibited in virtualized systems may be referred to herein as the "I/O blender" phenomenon.

SUMMARY

In accordance with the teachings of the present disclosure, I/O blending disadvantages and problems associated with traditional approaches to virtualizing information handling systems are reduced or eliminated.

In accordance with embodiments of the present disclosure, a cache storage method includes providing a storage cache cluster, comprising a plurality of cache storage elements, for caching I/O operations from a plurality of virtual machines associated with a corresponding plurality of virtual hard disks mapped to a logical storage area network volume or LUN, which is implemented on a plurality of hard disk drives (HDDs). Whenever a cache flush signal is detected, flush write back operations are performed to flush all cache blocks that must be written back to the LUN to achieve or preserve coherency. These blocks may be referred to herein as write back blocks.

The flush write back operations may include accessing current time data indicative of a current time, determining a current time window in accordance with the current time, determining a duration of the current time window, and identifying a current cache storage element corresponding to the current time window. For a duration of the current time window, only those write back blocks stored in the current cache storage element are flushed. In addition, the applicable write back blocks are flushed in accordance with logical block address information associated with each write back block.

A cache storage element may refer to a cache server that includes one or more cache storage devices or to individual cache storage devices depending upon the implementation. The flush write back operations may be performed at least once for each cache storage element whereby, in a storage cache cluster comprising N cache storage elements, the flush write back operations may be performed at least N times, including at least once for each of the N cache storage elements. The storage cache cluster may maintain storage cache cluster metadata including logical block address information associated with each cache block of the storage cache cluster. The order determined in accordance with the logical block address information may include a monotonically increasing LBA order, a monotonically decreasing LBA order, or another order. Write back blocks generated after a time window begins may be preserved in the storage cache cluster, i.e., not written back, until the next applicable time window. In some embodiments, the current time window may be determined in accordance with the current time and size information indicative of a storage capacity of a cache storage element. Monitoring the current time data may include monitoring node clocks on each of the plurality of cache servers and synchronizing the node clocks from time to time.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a central processing unit (CPU) or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
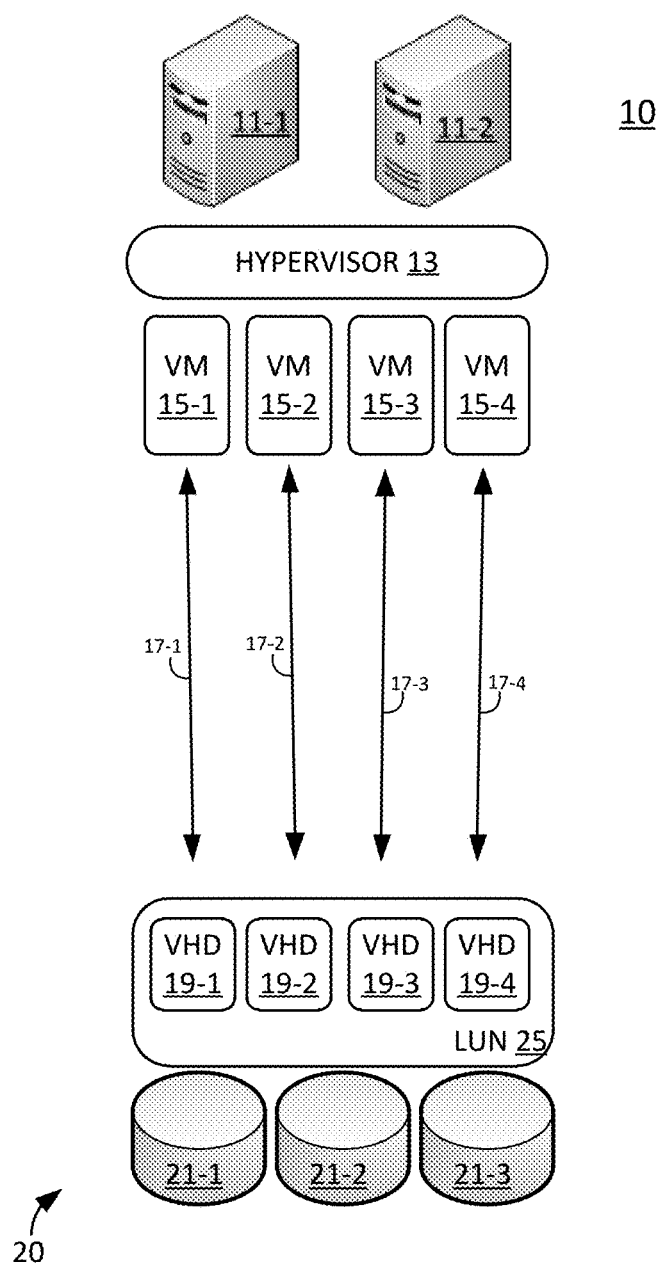
FIG. 1 illustrates a block diagram of an information handling system susceptible to I/O blending.

FIG. 1 illustrates an information handling system platform 10 susceptible to I/O blending. The depicted information handling system platform 10 includes a hypervisor 13, executing on a group of servers 11, that generates a plurality of virtual machines 15 and a corresponding plurality of virtual hard disks 19, each of which is mapped onto a single logical volume or logical unit number (LUN) 25 implemented on a group of HDDs 21.

The illustrated information handling system platform 10 includes two information handling systems, 11-1 and 11-2, from which hypervisor 13 has created virtual machines 15-1 through 15-4. FIG. 1 depicts virtual machines 15-1 and 15-2 executing on server 11-1 and virtual machines 15-3 and 15-4 executing on server 11-2, but different combinations of servers 11 and virtual machines 15 may be employed in other configurations.

The hypervisor 13 may represent any of a number of commercially distributed bare-metal hypervisors that support Linux-based operating systems, Windows operating systems, or both. In at least one embodiment, each server 11 executes an ESX or ESXi hypervisor from VMware, Inc. and an Enterprise Linux 6.4, or later, operating system (not depicted) from Red Hat, Inc.

The information handling system platform 10 of FIG. 1 further includes a storage area network (SAN) 20 that includes a logical storage volume, referred to herein as LUN 25, backed by a set of one or more hard disk drives HDDs 21. The depicted LUN 25 is implemented on a set of three HDDs 21-1 through 21-3, but LUN 25 may be implemented on any suitable number of HDDs 21. The HDDs 21 may be formatted in accordance with any suitable RAID format or other format. The three HDDs illustrated in FIG. 3 may, for example, be formatted as a RAID 5 volume in which one of the HDDs stores parity information and the remaining drives store user data.

The hypervisor 13 in FIG. 1 supports virtualized storage and each virtual machine 15 shown in FIG. 1 generates I/O transactions 17 addressing a corresponding virtual hard disk 19, where all of the virtual hard disks 19 map to a common logical storage object, i.e., LUN 25. Although not shown in FIG. 1, each I/O transaction 17 may include multiple I/O access operations, each of which corresponds to a logical block address (LBA) or another type of proximity-based storage address, in which consecutive addresses generally represent physically adjacent storage medium regions, each of which may correspond to a fixed-sized block of data.

When used in conjunction with HDDs 21, LBA information may be beneficially employed to reduce "seek" latency associated with the time required for an HDD to rotate the storage disk and/or move the read/write head when an I/O operation accesses a different storage address than a preceding I/O operation. For example, ordering a sequence of I/O operations according to LBA information, subject to any constraints required to maintain program order consistency, generally decreases seek latency by decreasing the cumulative seek travel associated with a group of I/O operations. Accordingly, an information handling system that generates a sufficient number of I/O transactions may, to the greatest extent possible, re-arrange or reorder the applicable I/O operations prior to execution.

References to data storage devices may refer specifically to non-volatile, direct access or random access, mass data storage devices including, as two prominent but non-limiting examples, a magnetic hard disk drive (HDD) and a solid state drive (SSD).

Figure 2:
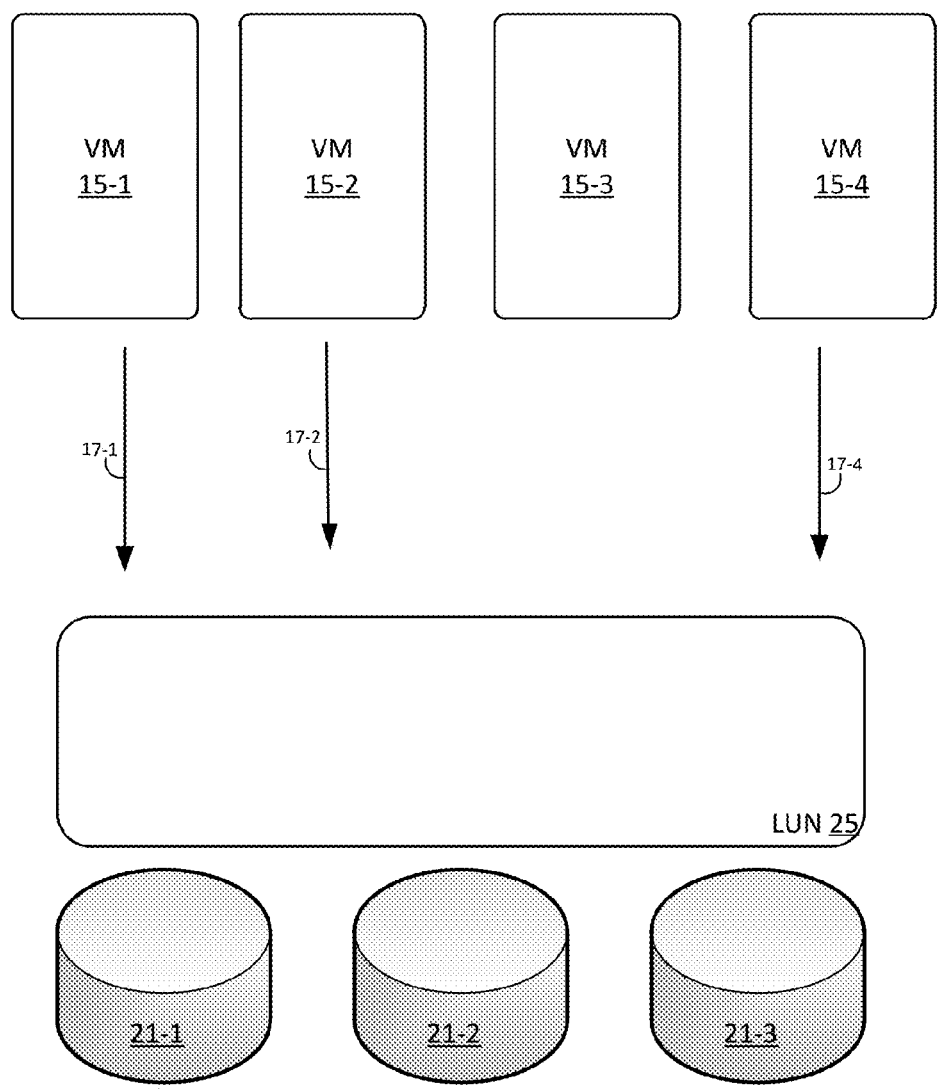
FIG. 2 illustrates a block diagram of an I/O transactions issued during a particular window of time.

In a virtualized environment such as the information handling system platform 10 in FIG. 1, LUN 25 may exhibit appreciable seek latency attributable to the simultaneous operation of multiple virtual machines, each of which may independently send I/O transactions to LUN 25. FIG. 2, which represents a snapshot of information handling system platform 10 for an arbitrarily short window of time, illustrates the virtual machines 15 issuing contemporaneous or substantially contemporaneous I/O transactions 17-1, 17-2, and 17-4.

At other points in time not depicted in FIG. 2 any combination of two or more of the virtual machines 15 may be issuing simultaneous or nearly-simultaneous I/O transactions 17. Under the assumption that each virtual machine 15 operates independently, any LBA ordering of the individual I/O transactions 17 may be partially or entirely offset by this inter-machine randomness. Moreover, while it may be theoretically feasible to implement information handling system platform 10 wherein SAN 20 maintains sufficient I/O transaction metadata to impose "downstream" LBA ordering, doing so may be prohibitive for reasons of cost, performance, compatibility, or a combination thereof.

Figure 3:
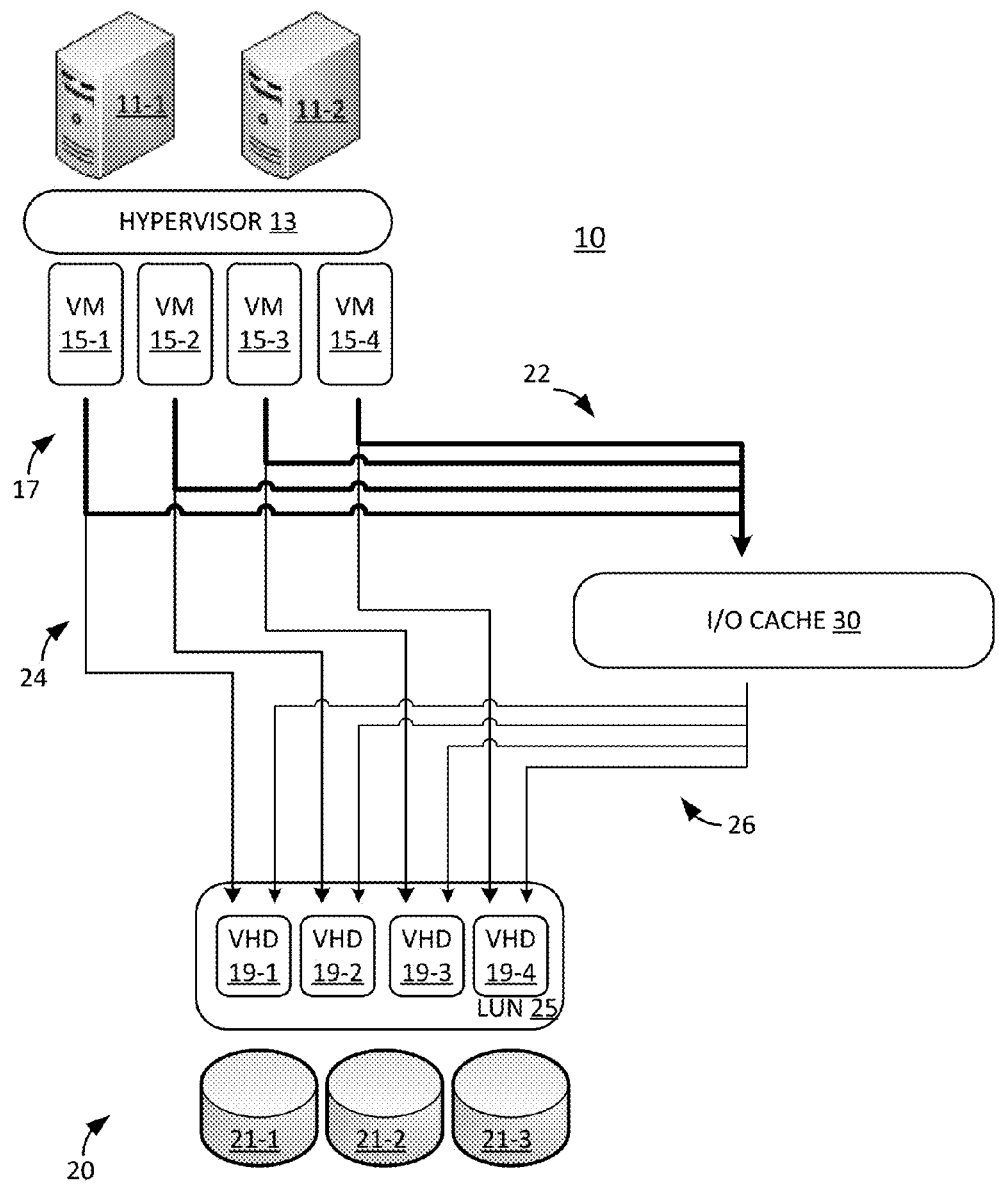
FIG. 3 illustrates a block diagram of an information handling system including a storage cache to improve I/O performance.

FIG. 3 illustrates an information handling system platform 10 that includes an I/O cache 30 to improve I/O performance by employing a comparatively fast storage medium, e.g., solid state drive (SSD) storage, to maintain a coherent copy of recently accessed portions of LUN 25 using a cache coherency protocol analogous to a MESI (modified-exclusive-shared-invalid) protocol or another suitable protocol found in any of various microprocessor architectures.

The percentage of I/O transactions 17 that complete without accessing the virtual machines 15 of LUN 25, also referred to as the hit ratio, is a measure of the extent to which the inclusion of I/O cache 30 improves the I/O performance of information handling system platform 10. The hit ratio is represented graphically, although not to scale, in FIG. 3 by the relative thickness of the applicable transaction lines. For example, the transaction lines 22 from virtual machines 15 to I/O cache 30 represent I/O transactions 17 that hit in I/O storage 30, the transaction lines 24 from virtual machines 15 to LUN 25 represent cache misses, and the transaction lines 26 from I/O cache 30 to LUN 25 represent cache write back transactions. While the hit ratio of any particular configuration is influenced by a number of factors including any I/O access characteristics of the workload, a sufficiently sized and designed I/O cache 30 may readily achieve a hit ratio exceeding 90% for a wide range of frequently encountered applications.

In the context of the virtualized environment described with respect to FIG. 1, a part of any I/O performance improvement achieved with I/O cache 30 may be attributable to a decrease in the I/O blender seek latency described with respect to FIG. 2. To some extent, however, I/O cache 30 may mask rather than cure I/O blender issues inherent in information handling system platform 10. For example, whenever I/O cache 30 writes back data to LUN 25 to maintain coherency with LUN 25, the previously described lack of LBA ordering may occur, resulting in an I/O blended write-back.

During periods of normal operation, the frequency and duration of write-backs from I/O cache 30 may be too low to warrant corrective action addressing I/O blending. In the context of a high availability application, however, any event that triggers a storage cache flush may expose the I/O latency vulnerability of information handling system platform 10.

The extent to which a storage cache flush may result in a high availability disruption varies with the cache/LUN ratio and the access performance of the HDDs 21. A high cache/LUN ratio suggests that, at any point in time, the number of write back blocks including, e.g., modified storage cache blocks, will be higher than in comparable systems having a smaller cache/LUN ratio. Slower HDDs 21 increase the I/O blending impact of any sequence of I/O accesses having a random LBA ordering. Anecdotal evidence suggests, however, that it is not uncommon to encounter systems with over-provisioned storage caches, e.g., sized to accommodate the entire working set of all virtual machines 15, coupled with economical, modestly performing HDDs, resulting in a worst case scenario for a flush write back disruption.

Figure 4:
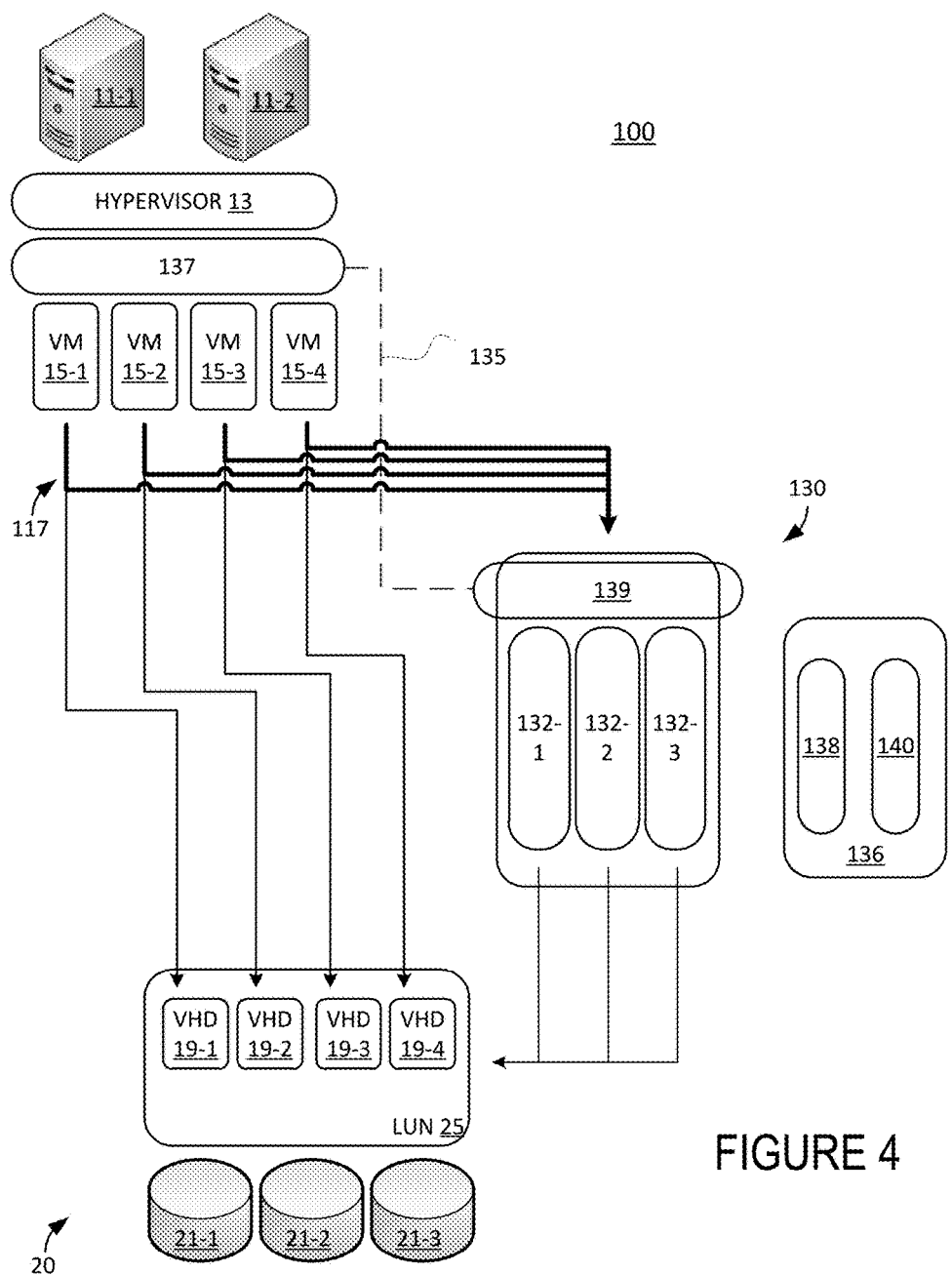
FIG. 4 illustrates a storage cache including a storage cache cluster and a cache cluster software layer.

FIG. 4 illustrates an information handling system platform 100 that includes or supports flush write back countermeasure features to reduce I/O blending latency including I/O blending latency that might otherwise occur following a high availability event that triggers a storage cache flush. The information handling system platform 100 of FIG. 4 includes a storage cache cluster 130 encompassing two or more storage cache resources 132 and a clustered cache module 135. The clustered cache module 135 may represent driver-like code that interfaces or otherwise communicates with hypervisor 13 and storage cache cluster 130 to receive information from and/or provide information to hypervisor 13 and/or storage cache cluster 130 and to manage or otherwise influence the operation of storage cache cluster 130 in a virtualized environment. Clustered cache module 135 may include features analogous to features found in the Fluid Cache set of features from Dell, Inc.

The depicted storage cache cluster 130 includes three storage cache resources 132, but other implementations may include more or fewer storage cache resources 132. The clustered cache module 135 may include hypervisor components 137 executing on each server 11 to communicate with hypervisor 13 and storage cluster components 139 executing on each storage cache resource 132. Whenever clustered cache module 135 detects a flush signal, clustered cache module 135 may define or identify windows of time during which I/O transactions 117 are issued in accordance with one or more attributes of storage cache metadata 136 to achieve a flush write back interval comprised of a sequence of temporally-localized flush write back periods within which clustered cache module 135 issues I/O transactions 117 in LBA order or substantially in LBA order.

The clustered cache module 135 may maintain LBA metadata 138 within storage cache metadata 136. The LBA metadata 138 may include LBA information identifying the LBA associated with each cache block as well as other information including, as examples, information indicating the storage cache resource 132, the virtual machine 15 and/or the virtual hard disk 19 associated with the corresponding cache block. The LBA metadata 138 may enable clustered cache module 135 or another resource to associate a cache block or another grain of storage cache metadata 136 with its corresponding LBA and with any one or more of the other metadata attributes maintained in storage cache metadata 136 The storage cache metadata 136 may also include coherency metadata 140 that indicates a coherency state of the applicable cache block, including one or more coherency states indicating cache blocks that require write back during a cache flush. In at least one embodiment, clustered cache module 135 may define the flush write back windows in accordance with LBA metadata 138 to assign or associate each flush write back window with a particular storage cache resource 132 wherein all of the write back transactions 117 issued by clustered cache module 135 during any flush write back window are associated with a single storage cache resource 132. The clustered cache module 135 may define a flush write back window corresponding to each storage cache resource 132 and cycle through the set of flush write back windows one or more times until the flush completes. In this manner, information handling system platform 10 may achieve a potentially significant reduction in I/O blending latency during a triggered cache flush without modifying the physical storage or otherwise significantly increasing the cost and complexity of information handling system platform 100 or its corresponding SAN 20.

In accordance with the preceding description of information handling system platform 100, the storage cache cluster 130 illustrated in FIG. 4 includes three storage cache resources 132, each of which may comprise a server or another type of information handling system provisioned with an SSD data storage device. An exemplary storage cache resource 132 may include any of various Dell® PowerEdge™ servers configured with one or more Dell® PowerEdge™ Express Flash PCIe SSDs. The storage cache cluster 130 illustrated in FIG. 4 further includes a clustered cache module 135 to communicate with hypervisor 13 and storage cache resources 132. The storage cache cluster 130 is configured to cache I/O transactions 117, generated by virtual machines 15, addressing virtual hard disks 19, each of which is mapped onto LUN 25 of SAN 20.

The clustered cache module 135 may represent processor executable instructions, stored on a computer readable medium, that, when executed by a processor of storage cache resource 132, server 11, or another processor, cause the applicable processor to perform flush write back operations. These instructions may include instructions executed whenever a flush write back signal is detected or a flush write back cycle is otherwise initiated.

Figure 5:
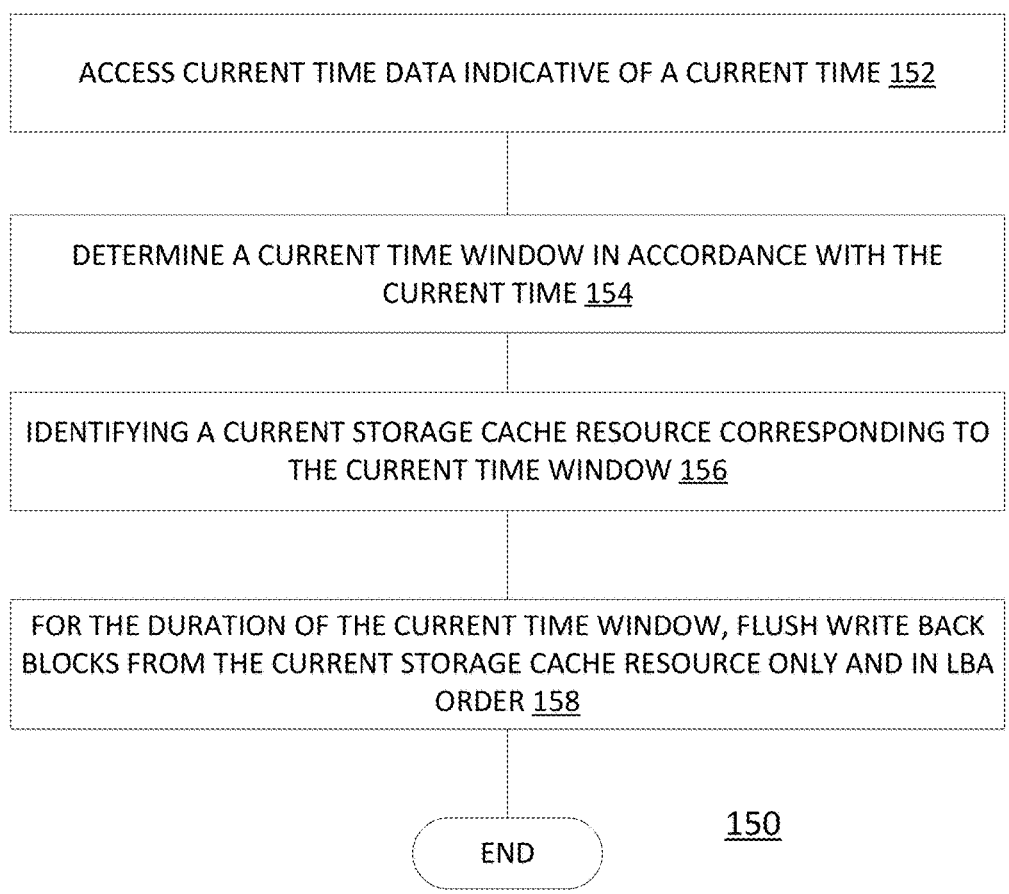
FIG. 5 illustrates a method of implementing a storage cache cluster.

FIG. 5 illustrates exemplary flush write back operations 150 corresponding to at least a portion of the clustered cache module 135 instructions. The flush write back operations 150 illustrated in FIG. 5 include accessing (operation 152) current time data indicative of a current time. The information handling system platform 100 may communicate with a Network Time Protocol (NTP) server and distribute NTP information to the node clocks maintained on each of the servers 11 and each of the storage cache resources 132 to facilitate timing synchronization among the components of information handling system platform 100. Other embodiments may use a different source of timing information, a different procedure for synchronizing time, or both.

The illustrated operations 150 further include determining (operation 154) a current time window in accordance with the current time. As suggested in the description of FIG. 4, the clustered cache module 135 of information handling system platform 100 may define N time windows corresponding to each of N storage cache resources 132 and resolve the current time into one of the N time windows where N is the number of storage cache servers 132 or storage cache devices in information handling system platform 10. Time windows may be of equal or different duration. When different duration time windows are used, the times windows may be determined in accordance with the size of the data storage devices within each storage cache resource 132, e.g., large data storage devices have longer time windows.

The operations 150 may further include identifying (operation 156) a current storage cache resource 132, which refers to the storage cache resource 132 identified by executing the applicable time window algorithm or performing the applicable time window calculation. In embodiments that do not employ equal-sized time windows, a time window interval assigned to the current storage cache resource 132 may also be calculated using an appropriate algorithm in accordance with storage cache metadata 136 or retrieved from storage cache metadata 136 or another storage resource.

Operations 150 may further include, for the duration of the current time window, flushing or writing back, (operation 158) in LBA order, only those cache blocks that (a) require write back and (b) are physically stored in the current storage cache resource 132. The cache blocks requiring write back, also referred to herein as write back blocks, may include cache blocks with a modified cache coherency state.

The clustered cache module 135 may order the write back blocks in LBA order using any suitable mechanism. Embodiments may, for example, hash or otherwise resolve the cache block address into which each I/O transaction 117 is stored using an algorithm that incorporates the applicable LBA, obtained from storage cache metadata 136, to ensure that I/O transactions 117 are stored in LBA order. Other embodiments may store I/O transactions 117 to the applicable storage cache resource 132 in random LBA order. In these embodiments, LBA ordering may be imposed by clustered cache module 135 as part of the flush write back cycle by identifying the cache blocks to be written back during the current window and searching the storage cache metadata 136 to identify the applicable cache block and its corresponding LBA.

Each storage cache resource 132 may include one or more SSDs or other type of cache storage device. In storage cache resources 132 that may include two or more cache storage devices, the time windows defined by clustered cache module 135 may correspond to the storage cache resource 132 as a whole or to an individual cache storage device, depending upon the implementation. Whether the cache storage unit associated with the current time windows comprises a storage cache resource 132 or a specific cache storage device, the applicable cache storage unit may be referred to herein as the cache storage element.

Thus, in some embodiments, the current time window may be associated with a current cache storage element and the current cache storage element may correspond to a storage cache resource 132. In some embodiments, each individual cache storage device comprises a cache storage element, two or more of which may be included within any one or more of the storage cache resources 132.

The determination of the time window durations may encompass one or more different algorithms or procedures. In equal-sized time window embodiments, the storage cache cluster 130 includes N cache storage elements and the operations 150 current time window is indicated by T MOD N where MOD indicates the modulo operation, T is an integer corresponding to the current time of day in the appropriate units of time, e.g., seconds. In at least one embodiment, each time window is a 1 second time window. In other embodiments of equal sized time windows, the time window may be longer or shorter than 1 second.

As suggested previously, alternatives to equal sized time windows may include embodiments in which the current time window is determined in accordance with the current time and cache storage capacity information indicative of a cache storage capacity of each cache storage element. In these embodiments, larger cache storage devices may receive longer time windows on the assumption that each cache will contain write back blocks roughly in proportion to the cache size.

More generally, time windows can be assigned based on any one or more attributes determinable by each of the storage cache resources 132. If each storage cache resource 132 is aware of every value that an attribute can assume and which of its members have a particular value of the attribute, the attribute may be used as a basis for defining a time window.

In some embodiments, a flush write back cycle may proceed within each time window by cycling through the identified cache blocks once in a monotonic LBA order, either lowest LBA to highest or vice versa. If a block within the current storage cache resource 132 transitions to a write back state after the flush write back cycle passes by the applicable LBA, the block is preserved in the storage cache cluster 130 until the next applicable window within the next flush write back write cycle occurs.

At the boundaries of consecutive time windows, a write back block identified towards an end of a time window may issue in the next time window potentially resulting in unwanted blending. To address this issue, some embodiments may monitor the time remaining in the current windows and may reduce their write back pipeline gradually as the end of the cycle approaches so that, ideally, zero blocks reside in the write back pipeline when any particular time window ends.

Although the present disclosure has been described in detail, it should be understood that various changes, substitutions, and alterations can be made hereto without departing from the spirit and the scope of the disclosure as defined by the appended claims.

What is claimed is:

1. A method comprising:
providing a storage cache cluster, comprising a plurality of cache storage elements, for caching input/output (I/O) operations for a plurality of virtual machines associated with a corresponding plurality of virtual hard disks mapped to a logical storage area network volume;
monitoring current time data, indicative of a current time, wherein said monitoring includes:
   monitoring node clocks on each of the plurality of cache storage elements; and
   synchronizing the node clocks from time to time;
responsive to detecting a cache flush signal, performing flush write back operations comprising:
   determining a current time window in accordance with the current time;
   identifying a current cache storage element corresponding to the current time window; and
   for a duration of the current time window, writing back particular write back blocks only, the particular write back blocks comprising write back blocks stored in the current cache storage element;
   wherein writing back the particular write back blocks comprises writing back the particular write back blocks in accordance with logical block address (LBA) information associated with each write back block.

2. The method of claim 1, wherein each of the plurality of cache storage elements comprises a corresponding one of a plurality of cache servers.

3. The method of claim 1, wherein:
the plurality of cache storage elements includes:
   one or more cache servers wherein each of the one or more cache severs includes one or more cache storage devices.

4. The method of claim 1, wherein the storage cache cluster comprises N cache storage elements and wherein performing the flush write back operations includes performing the flush write back operations at least N times, including performing the flush write back operations at least once for each of the N cache storage elements.

5. The method of claim 1, wherein:
providing the storage cache cluster includes maintaining storage cache cluster metadata including LBA information associated with each valid cache block of the storage cache cluster.

6. The method of claim 5, wherein writing back the particular write back blocks in accordance with the LBA information comprises writing back the particular write back blocks in an order determined in accordance with the logical block address information comprises an order selected from:
a monotonically increasing LBA order; and
a monotonically decreasing LBA order.

7. The method of claim 1, wherein the current time window is determined in accordance with:
the current time; and
cache storage element size information indicative of a cache storage capacity of each cache storage element.

8. A storage cache cluster, comprising:
a plurality of information handling systems, each of the plurality of information handling systems including:
   a processor;
   a solid state drive comprising a cache storage element of the storage cache cluster; and
   a memory including processor executable program instructions that, when executed, cause the storage cache cluster to perform flush write back operations responsive to detecting a cache flush signal, the flush write back operations comprising:
      accessing current time data indicative of a current time;
      determining a current time window in accordance with the current time;
      identifying a current cache storage element corresponding to the current time window;
      for a duration of the current time window, writing back particular write back blocks only, the particular write back blocks comprising write back blocks stored in the current cache storage element; and
      reducing, during a latter portion of the current time window, a pipeline depth of a write back pipeline;
      wherein writing back the particular write back blocks comprises writing back the particular write back blocks in accordance with logical block address (LBA) information associated with each write back block.

9. The storage cache cluster of claim 8, wherein the storage cache cluster comprises N cache storage elements and wherein writing back the particular write back blocks includes performing the flush write back operations N times, including performing the flush write back operations once for each of the N cache storage elements.

10. The storage cache cluster of claim 8, further comprising:
maintaining storage cache cluster metadata including LBA information associated with each cache block of the storage cache cluster.

11. The storage cache cluster of claim 8, wherein the current time window is determined in accordance with the current time and cache storage capacity information indicative of a cache storage capacity of each cache storage element.

12. The storage cache cluster of claim 8, wherein the flush write back operations include monitoring the current time data, wherein monitoring the current time date includes:
monitoring node clocks on each of a plurality of cache servers; and
synchronizing the node clocks from time to time.

13. The storage cache cluster of claim 8, wherein:
the storage cache cluster includes a plurality of cache servers;
the plurality of information handling systems include a first cache server;
the first cache server includes a first solid state drive; and
the first solid state drive corresponds to a first cache storage element of a plurality of cache storage elements.

14. The storage cache cluster of claim 13, wherein:
the first cache server includes a second solid state drive; and
the first cache storage element includes the first solid state drive and the second solid state drive.

15. The storage cache cluster of claim 13, wherein:
the first cache server includes a second solid state drive; and
the second solid state drive corresponds to a second cache storage element of the plurality of cache storage elements.

16. A cache server, comprising:
at least one processor;
at least one solid state drive; and a memory including processor executable program instructions that, when executed by the processor, cause the processor to perform flush write back operations, comprising:

monitoring current time data, indicative of a current time, wherein said monitoring includes:
  monitoring node clocks on each of the plurality of cache storage elements; and
  synchronizing the node clocks from time to time;

responsive to detecting a cache flush signal, performing flush write back operations comprising:

determining a current time window in accordance with the current time;

identifying a current solid state drive corresponding to the current time window; and for a duration of the current time window, writing back only particular write back blocks, comprising write back blocks stored in the current solid state drive wherein writing back the particular write back blocks comprises writing back the particular write back blocks in accordance with logical block address (LBA) information associated with each write back block.

17. The cache server of claim 16, wherein the at least one solid state drive includes N solid state drives and wherein performing the flush write back operations includes performing the flush write back operations N times, including performing the flush write back operations once for each of the N solid state drives.

18. The cache server of claim 16, further comprising:
maintaining solid state drive metadata including LBA information associated with each cache block of the solid state drive.

* * * * *